United States Patent [19]

Upmeier et al.

[11] Patent Number: 4,494,877
[45] Date of Patent: Jan. 22, 1985

[54] FUNNEL MEMBER FOR SINGLE-SCREW EXTRUDER

[75] Inventors: Hartmut Upmeier; Thilo Schreiber, both of Lengerich, Fed. Rep. of Germany

[73] Assignee: Windmoller & Holscher, Lengerich, Fed. Rep. of Germany

[21] Appl. No.: 516,375

[22] Filed: Jul. 22, 1983

[30] Foreign Application Priority Data

Jul. 22, 1982 [DE] Fed. Rep. of Germany ....... 3227443

[51] Int. Cl.³ ............................ B28C 7/04; B29F 3/02
[52] U.S. Cl. ........................................ 366/76; 366/79; 425/208; 425/209
[58] Field of Search ............... 366/76, 79, 98, 99, 366/150, 318; 425/202, 207–209; 241/260.1

[56] References Cited

U.S. PATENT DOCUMENTS

| | | | |
|---|---|---|---|
| 3,331,101 | 7/1967 | Thomas, Jr. ........................... | 366/76 |
| 3,666,386 | 5/1972 | McElroy et al. ...................... | 366/79 |
| 4,408,725 | 10/1983 | Wenger et al. ........................ | 366/79 |

Primary Examiner—Timothy F. Simone
Attorney, Agent, or Firm—Fleit, Jacobson, Cohn & Price

[57] ABSTRACT

The funnel member of a single-screw extruder comprises a housing and a feed screw which passes at least partially axially therethrough and is sealed from the drive shaft by a return feed screwthread covered by a bushing which is fixed with respect to the housing. The feed screw is enveloped by a grooved sleeve having take-in grooves which are parallel to the axis and become shallower in the feeding direction. For charging the material, the funnel member is provided with an eccentric filling aperture tangential to the feed screw. To reduce torque and pressure fluctuations caused in the charged thermoplastic masses by the threads of the screw running past the single aperture, the grooved sleeve (9) is provided with take-in grooves (10, 11) over its entire circumference only in the zone upstream of the filling aperture (4) and, in the region of the filling aperture (4), is provided with take-in grooves (10) only in the part substantially radially opposite to the filling aperture (FIG. 3).

7 Claims, 3 Drawing Figures

FUNNEL MEMBER FOR SINGLE-SCREW EXTRUDER

The invention relates to a funnel member for a single-screw extruder, comprising a housing and a feed screw which passes at least partially axially therethrough and is sealed from the drive shaft by a return feed screwthread covered by a bushing which is fixed with respect to the housing, a grooved sleeve enveloping the feed screw and having take-in grooves which are parallel to the axis and become shallower in the feeding direction, and an eccentric filling aperture tangential to the feed screw.

It is known to provide the take-in zone in the region of the funnel member of the cylindrical extruder housing with a so-called grooved sleeve which is provided over a certain axial length with take-in grooves which are parallel to the axis, become increasingly shallower and merge with the cylindrical bore of the housing and inhibit turning of the granulate so as to increase the feeding capacity of the screw extruder. More accurate investigations have shown that, for each revolution of the screw, torque or pressure fluctuations in the order of $+/-2\%$ are produced in the thermoplastic mass, which influence the longitudinal tolerances of the extruded product and have a disadvantageous effect. The pressure or feeding thrusts periodically created for each revolution of the feed screw are caused by passage of the feeding thread over the front edge of the filling aperture.

Funnel members with an eccentric filling aperture tangential to the feed screw are known and they serve to improve the supply of granulate By reason of the eccentric tangential aperture, the width of this aperture amounts to only about half the diameter of the feed screw. In order nevertheless to achieve adequate filling during high screw speeds, the axial length of the tangential aperture was extended up to 2.5 D (where D=diameter of the feed screw). In the known funnel member, the grooved sleeve which is provided on its inner face with uniformly circumferentially distributed take-in grooves extends along the zone of the filling aperture and is provided with an opening corresponding to the aperture cross-section of the filling aperture. Even in known funnel members with an eccentric tangential filling aperture, one still encounters periodic pressure increasing feed thrusts for each revolution of the screw.

It is therefore the problem of the invention to provide a funnel member of the aforementioned kind which permits charging of the thermoplastic masses with reduced torque and pressure fluctuations.

According to the invention, this problem is solved in that the grooved sleeve is provided with take-in grooves over its entire circumference only in the zone upstream of the filling aperture and, in the region of the filling aperture, is provided with take-in grooves only in the part substantially radially opposite to the filling aperture. In the funnel member according to the invention, the take-in grooves disposed on the diameter side of the grooved sleeve opposite to the filling aperture are extended up to the region of the return feed screwthread whereas in the diameter zone of the filling aperture the interior of the grooved sleeve has no grooves. By means of this construction, the charged thermoplastic plastics granulate or powder can fill the screwthread over half the thread circumference below the filling aperture before the grooves come into effect and support delivery of the charged material in the axial direction. The supplied material is in this way precompressed and subsequently fills all the take-in grooves behind the filling aperture so that, in co-operation with the threads of the screw, a high granulate pressure can be built up and a high feeding rate can be achieved with a more uniform feed. The funnel member according to the invention leads to evening out of the feed at high feed capacities.

According to an embodiment of the invention, further smoothing and evening out of the feeding behaviour and thus of the torque can be achieved in that the feed screw is provided with at least three feeding threads over the zone of the take-in grooves that become flat. Since the taking-in of the plastics material by a multi-start screw creates pressure and feed thrusts of higher frequency and lower amplitude, which are already less objectionable than the periodic feed thrusts of higher amplitude for each revolution of the feed screw, the multi-start of the feed screw enables still further evening out of the feeding behaviour to be achieved.

To compensate the thread volume in the multi-start zone of the feed screw, a further embodiment of the invention provides that the width of the feeding threads in the multi-thread zone is substantially only half the width of the feeding thread in the single-thread zone of the feed screw. Further, the lead of the feeding threads in the multi-thread zone of the feed screw can be larger than that of the feeding thread in the single-thread zone so that the same feeding rate can be maintained in both thread zones by means of this feature.

In known grooved sleeves having take-in grooves uniformly distributed over their circumference and extending substantially over their entire length, considerable wear has been found to occur at the feed screw, the filling aperture and the take-in zone of the cylindrical bore, this being caused by the abrasive action of the fillers added to the as yet unliquefied granulate. This abrasive wear can likewise be considerably reduced by the construction of the funnel member according to the invention.

In the single-thread zone, the feeding thread of the feed screw desirably has a lead of $H=1D$, corresponding to an inclination of 17.4° to the screw axis. Larger inclinations could result in unstable feeding whereas smaller inclinations could lead to a longer period of retention of the melt in the feed screw and thus an undesirable increase in the melt temperature through unnecessary conversion of the driving energy into heat of the melt. In the multi-thread zone, the lead of the feeding threads is desirably $H=1.1D$.

One example of the invention will now be described in more detail with reference to the drawing, wherein.

Figure 1:
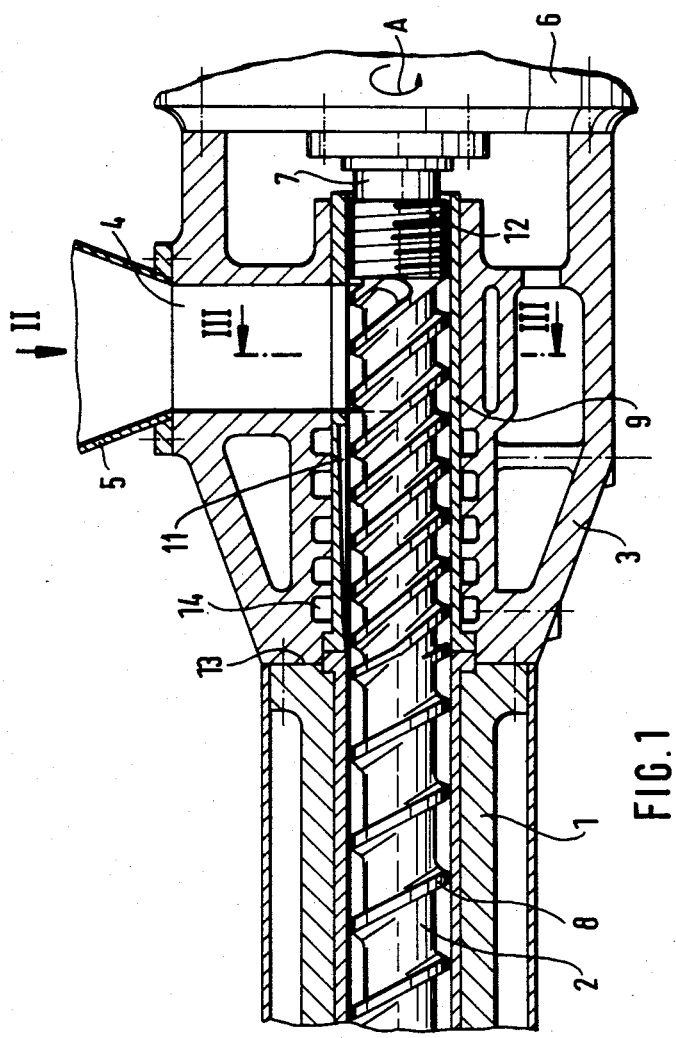
FIG. 1 is a longitudinal section through the funnel member.
Figure 2:
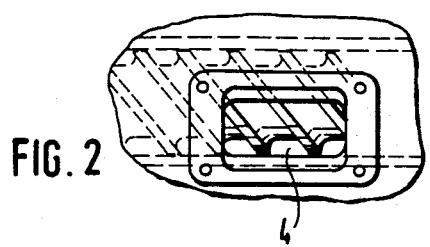
FIG. 2 is a plan view of the eccentric tangential filling aperture viewed in the direction II in FIG. 1.

The feed screw or worm 2 is mounted in the cylindrical bore of the housing 1. Screwed to the cylindrical housing 1, there is the housing portion 3 of the funnel member that is provided with an eccentric filling aperture 4 tangential to the feed screw 2. The filling funnel 5 is placed over the filling aperture 4. Gearing 6 is connected to the housing portion 3 that has the filling aperture 4 and the output shaft of the gearing is connected to the shaft 7 of the feed screw 2 and drive same in the direction of the arrow A.

Figure 3:
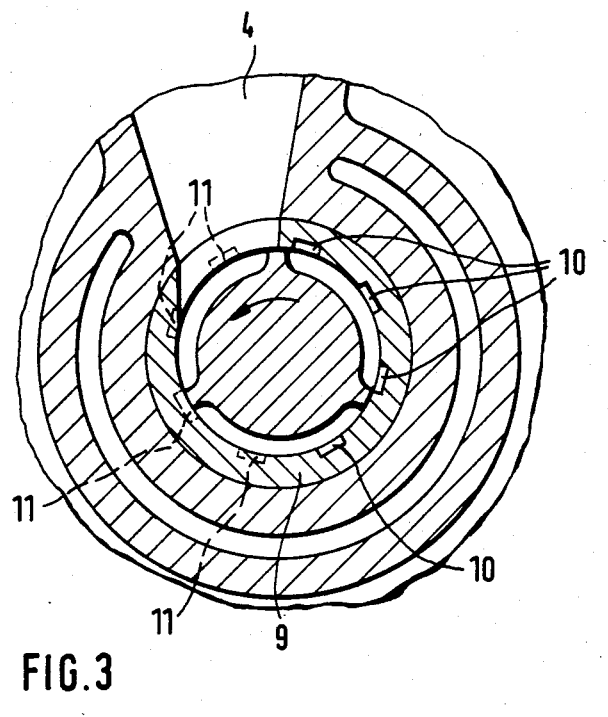
FIG. 3 is a cross-section through the funnel member taken on the line III—III in FIG. 1.

In the region of the smooth-walled bore in housing 1, the feed screw 2 has only one feeding thread 8. The grooved sleeve 9 is mounted in an axial bore in the housing 3 of the funnel member and, as best seen in FIG. 3, is provided with take-in grooves 10 substantially over its entire length on its right-hand diameter side which is substantially radially opposite to the zone of the filling aperture 4. On the opposite diameter side corresponding to the filling zone, the grooved sleeve 9 is provided with take-in grooves 11 which, as shown in FIG. 1, terminate in front of the filling aperture 4 and are closed at the ends. The take-in grooves 10 terminate in the region of the return feed screwthread 12 so that the screw is sealed by the return feed thread 12 from the smooth region of the grooved sleeve 9.

The junction between the heated housing 1 and the cooled housing 3 of the funnel member is thermally insulated in known manner. The housing 1 is provided with heating and cooling elements which are known and therefore not illustrated.

In the housing 3 of the funnel member, the grooved sleeve 9 is surrounded by cooling channels 14 which are provided with connections for supplying and withdrawing cooling water.

In the region of the grooved sleeve 9, the feed screw 2 continues with three single-start feeding threads 8. In the multi-start zone, the feeding threads are narrower.

In the region of the eccentric tangential filling aperture 4, the axially parallel take-in grooves 11 of the grooved sleeve 9 terminate just in front of the front end of the filling aperture. In the region of the filling aperture 4, the inner cylindrical wall of the grooved sleeve 9 has no take-in grooves and is completely smooth. In the zone opposite to the filling aperture, the grooved sleeve 9 is provided with axial take-in grooves 10 which extend into the region of the return feed thread 12. The granulate or powder introduced in the filling aperture 4 can, in the region of the filling aperture, fill the threads over half the screw circumference before the take-in grooves 10 extending into the region of the return feed threads 12 come into effect and take the material away in the axial direction. The material thus precompressed subsequently fills all the take-in grooves 10, 11 so that the desired high granulate pressure can build up and a high feeding capacity is ensured.

By means of the described construction of the grooved sleeve, one obtains such complete filling of the feed screw below the filling aperture 4 that the axial length of the aperture 4 is adequate at about 1D.

The multiple start of the feed screw 2 in the region of the grooved sleeve 9 brings about a reduction in the feed thrusts at higher frequency by reason of reduced filling of the screw threads with granulate or powder, thereby achieving good evening out of the torque.

For the efficient functioning of the feed screw with a grooved take-in sleeve, it is important that the screw be provided with a preferably uniform shallower thread in this zone. To compensate for the additional thread volume in the multi-start take-in zone, the axial width of the individual multi-start take-in threads is about half that of the single-start screwthread 8. One of the multi-start take-in threads merges with the actual wider feeding thread 8 by changing its lead angle.

We claim:
1. A single-screw extruder comprising:
a housing;
a sleeve defined by said housing;
a feed screw mounted within said sleeve;
an eccentric filling aperture defined by the housing being positioned tangentially to said feed screw;
a plurality of grooves defined by said housing being in communication with said sleeve and extending parallel to the longitudinal axis of said sleeve, said plurality of grooves decreasing in depth along the longitudinal axis of the sleeve;
a first zone of said sleeve positioned adjacent to said eccentric filling aperture wherein said plurality of grooves are spaced about the circumference of said sleeve; and
a second zone of said sleeve including said eccentric filling aperture wherein some of said plurality of grooves are spaced about a portion of the circumference of said sleeve, said portion of the circumference of the sleeve extending from one edge of the eccentric filling aperture to a point radially opposite to the one edge of the eccentric filling aperture.

2. A single-screw extruder as claimed in claim 1, wherein the ends of the plurality of grooves positioned only in the first zone of the sleeve are deepest in depth adjacent to the eccentric filling aperture.

3. A single-screw extruder as claimed in claim 1, wherein the feed screw positioned in said first zone and said second zone of said sleeve defines at least three feeding threads.

4. A single-screw extruder as claimed in claim 3, further comprising a third zone of said sleeve having a smooth wall and said feeding screw positioned in said third zone of said sleeve defining a single thread and said at least three feeding threads defined by the feeding screw in said first zone of said sleeve being half the width of the single feeding thread in said third zone of said sleeve.

5. A single-screw extruder as claimed in claim 4, wherein a lead angle of the feeding threads of the feed screw in said first and second zones of said sleeve is greater than the lead angle of the single feeding thread of the feed screw in said third zone of said sleeve.

6. A single-screw extruder as claimed in claim 5, wherein the lead angle of the feeding threads of the feed screw in said first and second zones of said sleeve is approximately 1.1 times greater than the lead angle of the feeding thread of the feed screw in said third zone of said sleeve.

7. A single-screw extruder as claimed in claim 1, wherein the length of the eccentric filling aperture in the longitudinal direction is approximately equal to the diameter of the feed screw.

* * * * *